United States Patent [19]

Bäcklund

[11] Patent Number: 4,554,985
[45] Date of Patent: Nov. 26, 1985

[54] ROTARY DRILL BIT

[75] Inventor: Lars K. Bäcklund, Sandviken, Sweden

[73] Assignee: Santrade Limited, Sandviken, Sweden

[21] Appl. No.: 678,776

[22] Filed: Dec. 6, 1984

[30] Foreign Application Priority Data

Jan. 3, 1984 [SE] Sweden ............................... 8400015

[51] Int. Cl.⁴ ............................................. E21B 10/22
[52] U.S. Cl. ........................................ 175/371; 384/94
[58] Field of Search ..................... 175/359, 371, 372; 277/84, 165, 177; 384/92, 94, 152, 489

[56] References Cited

U.S. PATENT DOCUMENTS

| 2,420,104 | 5/1947 | Smith | 277/177 |
| 3,127,942 | 4/1964 | Neilson | 175/372 X |
| 3,698,728 | 10/1972 | Walker | 277/165 |
| 4,372,624 | 2/1983 | Neilson | 384/94 |

FOREIGN PATENT DOCUMENTS 1228965 4/1971 United Kingdom ............... 175/372

Primary Examiner—James A. Leppink
Assistant Examiner—John F. Letchford
Attorney, Agent, or Firm—Burns, Doane, Swecker & Mathis

[57] ABSTRACT

A rotary drill bit comprising a head and a roller cutter rotatably carried thereon, wherein an annular sealing means is arranged in an annular chamber adjacent to a gap between the roller cutter and the head. At least one of the sealing surfaces of the chamber is generally seen V-shaped. According to the invention larger sealing pressure is obtained at two circumferentially spaced portions of the V-shaped sealing surface than at an intermediate portion thereof while simultaneously maintaining sealing pressure along the entire circumferential extent of the sealing means between said spaced portions.

8 Claims, 5 Drawing Figures

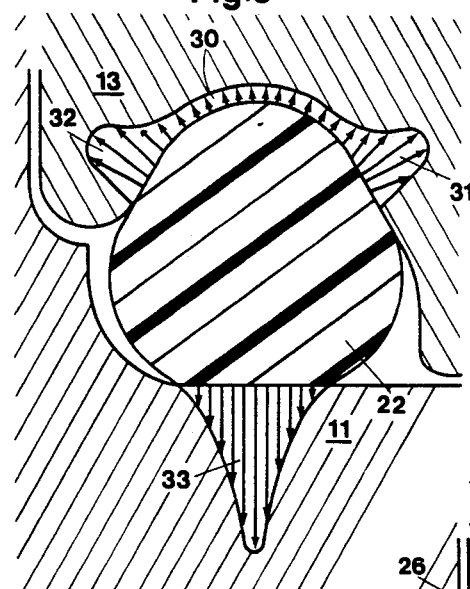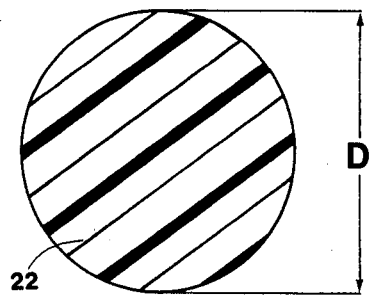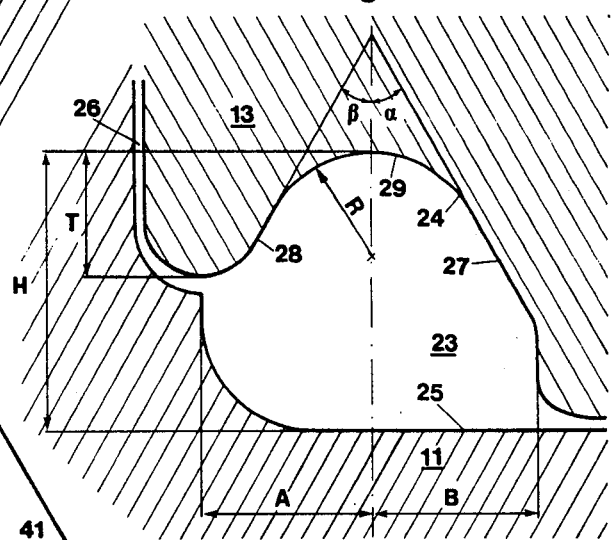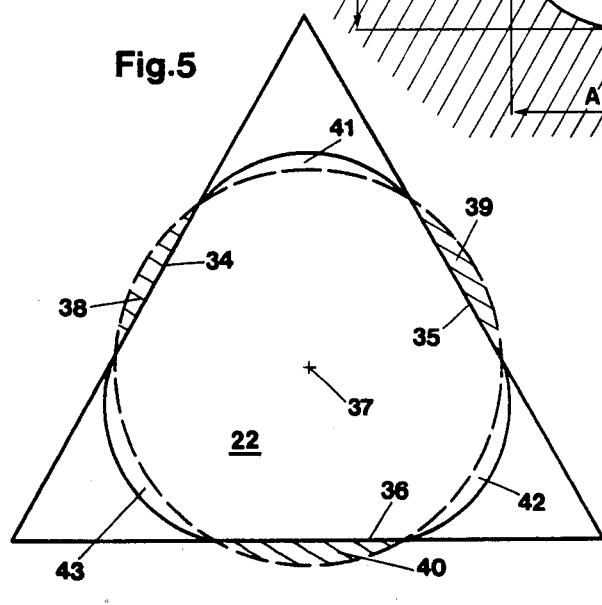

ROTARY DRILL BIT

BACKGROUND AND OBJECTS OF THE INVENTION

The present invention relates to a rotary drill bit comprising a head, at least one roller cutter which is rotatably carried by the head upon bearing means, and a resilient annular sealing means disposed in an annular chamber for sealing the bearing means. The chamber comprises a first sealing surface in the roller cutter and a second sealing surface on the head; at least one of said sealing surfaces being generally V-shaped.

The object of the present invention is to provide a rotary drill bit of the above-mentioned type in which the sealing means is squeezed in the V-shaped sealing surface so that relative movement occurs only at the opposed sealing surface.

Another object of the invention is to provide a rotary rock drill in which the pressure distribution at the sealing surfaces is optimized.

A further object of the invention is to provide a rotary rock drill in which, during drilling, the change in shape of the sealing means is facilitated in direction toward the sealing surface opposed to the V-shaped sealing surface.

BRIEF DESCRIPTION OF THE DRAWINGS

The invention is described in detail in the following description with reference to the accompanying drawings in which one embodiment is shown by way of example. It is to be understood that this embodiment is only illustrative of the invention and that various modifications thereof may be made within the scope of the claims.

In the drawings.

FIG. 2 shows in section one embodiment of a sealing means included in a rotary drill bit according to the invention.

FIG. 3 shows on an enlarged scale the encircled portion in FIG. 1.

FIG. 4 shows on an enlarged scale the encircled portion in FIG. 1, where the sealing means is removed.

FIG. 5 illustrates the deformation of the sealing means when the drill bit is assembled.

DETAILED DESCRIPTION OF A PREFERRED EMBODIMENT OF THE INVENTION

Figure 1:
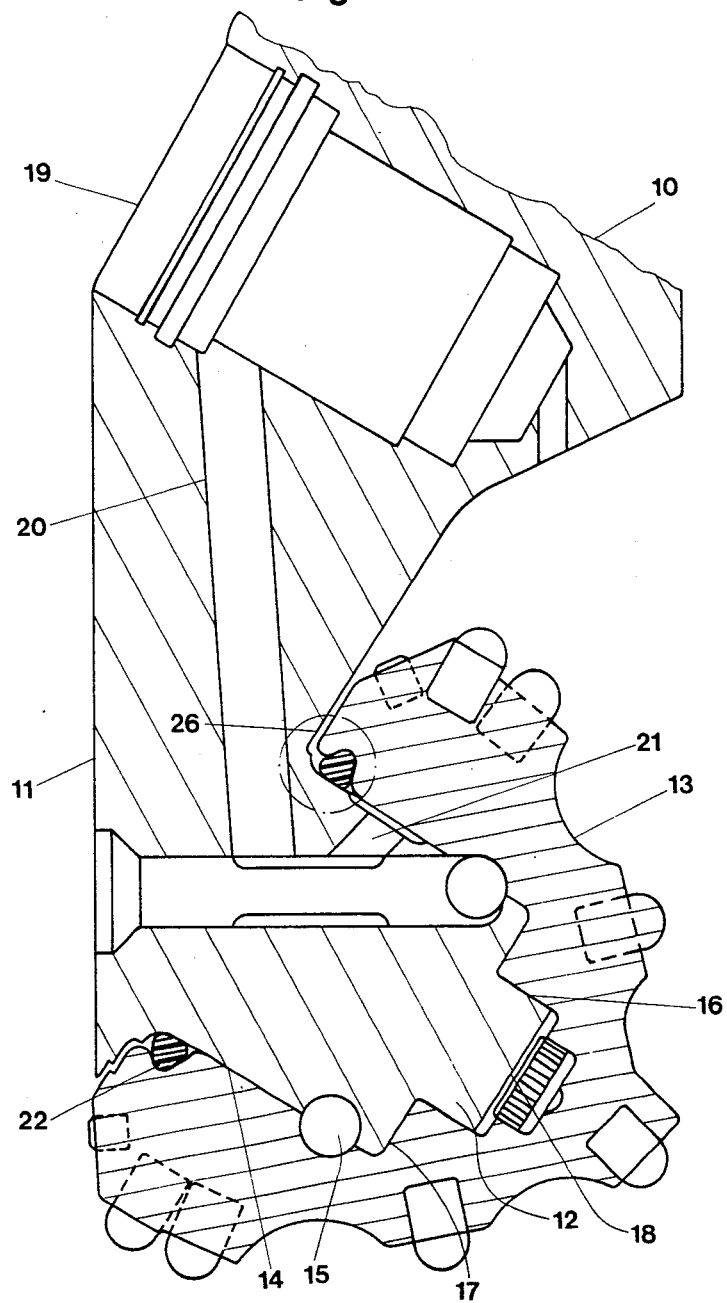
FIG. 1 shows in section one embodiment of a rotary drill according to the invention.

In FIG. 1 the lowermost portion of the head of a roller bit for rotary drilling in rock and earth formations is denoted 10. The bit head 10 comprises in conventional manner three separate legs. In FIG. 1 only one leg is shown and denoted by 11. The lowermost portion of the leg 11 is formed as a bearing shaft 12 upon which a roller cutter 13 provided with cutting means, such as hard metal inserts, is rotatably carried over a bearing system comprising a radial friction bearing 14, a ball bearing 15, a radial friction bearing 16 and axial friction bearings 17, 18.

Lubricant is supplied to the bearing system through passages 20, 21 from a lubricant reservoir 19 in the leg 11. A resilient annular sealing means 22 is disposed in an annular chamber 23 in connection with a gap 26 between the roller cutter 13 and the leg 11 for sealing the bearing system, i.e. the sealing means 22 shall on the one hand prevent drillings and other impurities from entering from outside into the bearing system and on the other hand prevent leakage of lubricant out from the bearing system. The chamber 23 comprises a sealing surface 24 in the roller cutter 13 and a sealing surface 25 on the leg 11. At least one of the sealing surfaces 24, 25 is generally V-shaped. The sides of the groove defined by the V-shaped surface can be of arbitrary shape, such as straight, slight convex or slight concave, provided that they have a projected surface area falling on the opposed sealing surface.

According to the preferred embodiment the sealing means 22 and the V-shaped sealing surface 24 are mutually dimensioned such that the sealing pressure, i.e. the contact pressure of the sealing means, is larger at two circumferentially spaced portions 27, 28 of the sealing surface 24 than at an intermediate portion 29 thereof. This means basically that the main sealing occurs at the outer portions of the sealing surface 24 and means further that the sealing means 22 becomes squeezed in the V-shaped sealing surface 24 so that relative movement does occur only at the sealing surface 25.

In the illustrated embodiment the sealing means 22 is an O-ring seal. The V-shaped sealing surface 24 is provided on the roller cutter 13 which means that the O-ring is squeezed or pinched in the roller cutter, thereby ensuring that relative movement arises only between the O-ring 22 and the leg 11. This is advantageous since the relative velocity becomes lower than compared to the relative velocity where the relative movement occurs between the O-ring and the roller cutter and since the circumference of the sealing surface where relative movement occurs becomes smaller.

As shown in FIG. 3 the O-ring 22 and the sealing surfaces 24, 25 are mutually dimensioned such that a certain contact pressure, denoted by 30 in FIG. 3, does arise also at the intermediate portion 29 of the sealing surface 24. The contact pressure 30, however, is considerably smaller than the contact pressures 31, 32 at the portions 27, 28 of the sealing surface 24. The sealing pressure 30 both increases the active sealing surface area between the O-ring 22 and the roller cutter 13 and ensures that no pockets do arise at the portion 29, which pockets could create a pumping action so that lubricant would be pumped out of the bearing system.

Due to clearances in the bearing system the roller cutter 13 might have a radial movability up to 0.2 mm and an axial movability up to 0.4 mm; said values increasing upon wear of the bearings. If the O-ring 22 was not squeezed in the roller cutter 13 (or alternatively in a groove in the leg 11) then either the entire O-ring would slide sidewards or slide sidewards at the unloaded side of the drill bit and be tortured at the loaded side thereof. Such an axial relative movement or "wobbling", respectively, of the O-ring might, besides the negative influence on the life of the O-ring, cause impurities to be fed into the bearing system and lubricant to be pumped out thereof.

The surface being most difficult to seal against is the one where relative movement occurs, i.e. against the sealing surface 25 on the leg 11. According to the preferred embodiment it is ensured that the nominal sealing pressure at the sealing surface 25, denoted by 33 in FIG. 3, is larger than the sealing pressures 31, 32.

In the illustrated embodiment the V-shaped sealing surface 24 has a confined angle, $\alpha+\beta$ in FIG. 4, smaller than 70°, and the circumferentially spaced portions 27, 28 of the sealing surface 24 are planar and form angles $\alpha$ and $\beta$ of substantially equal size with the normal to the sealing surface. The intermediate portion 29 of the sealing surface 24 is curved. The radius of curvature R is smaller than the radius D/2 of the O-ring in relaxed condition and the curved portion 29 is tangential to the portions 27,28. Further, the largest extension H of the chamber 23 in radial direction is between 90% and 150% of the diameter D of the O-ring in relaxed condition. In the illustrated embodiment the largest radial extension of the portion of the roller cutter 13 nearest to the gap 26 is larger than R (1-sin $\beta$), where $\beta$ is the angle between the portion 28 and the normal to the sealing surface 25; said radial extension being defined as T in FIG. 4 and being measured from the bottom of the portion 29 toward the sealing surface 25. The largest extension of the chamber 23 in axial direction from the normal to the sealing surface 25, defined as A and B in FIG. 4, is in the same size in both directions. Due to the illustrated and preferred embodiment the change in shape of the O-ring 22 in direction toward the sealing surface 25 is facilitated. Further, the O-ring 22 becomes axially centered approximately in the middle of the chamber 23, thus ensuring that there is provided space for allowing axial deformation of the O-ring in both directions when the chamber 23 is changed in shape radially.

In FIG. 5 the principle is illustrated for an optimized building-in of the O-ring 22. Basically the O-ring can be considered as being squeezed or pinched between three surfaces, namely the surfaces 34,35 in the roller cutter 13 and the surface 36 on the leg 11. If, for the sake of simplicity, the triangle, where the surfaces 34,35,36 each forms a part of a side of the triangle, is considered to be equilateral then the centre 37 of the O-ring 22 remains in the same position during the squeeze of the O-ring. Thus, the shape of the O-ring has to be changed. The "squeezed" portions 38,39,40 push away material, thereby causing the O-ring to bulge or expand at the portions 41,42,43. The deformation force, i.e. the sealing pressure, can be considered as depending on the size of the deformation and of the deformation stiffness. The deformation stiffness or the form factor f in its turn depends on, among other things, the number of deformation positions. Thus, three deformation positions creates a form factor which is larger than that obtained by two deformation positions; in the order of say 50% larger. Due to the fact that the radial compression for a certain sealing force becomes smaller with a three-position-deformation than with a two-position-deformation the heat generation at the movable sealing surface of the sealing ring becomes smaller, which favourably affects the life of the sealing ring, especially at high number of revolutions of the drill bit.

As above-said in connection with the description of the preferred embodiment the O-ring 22 is not allowed to fill all the deformation space 23. Due to the restricted radius R the bulging against the leg 11 will be, relatively seen, larger and the compression against the surfaces 27,28 in the roller cutter 13 will be, relatively seen, smaller. This means that the sealing pressure against the leg 11 increases and that the peaks of the sealing pressure against the surfaces 27,28 decrease, thus concentrating the sealing force on the surface being most difficult to seal against, i.e. the surface 25 where relative movement occurs.

The above advantages described in connection with an O-ring seal can also be achieved by means of sealing means having other cross section than the circular one. Specifically, the sealing means can be formed with a half-circular outer surface intended to be mounted in the roller cutter and formed with a somewhat larger extension in radial than in axial direction.

What is claimed is:

1. In a rotary drill bit of the type comprising a head, at least one roller cutter rotatably mounted on said head by means of bearings for rotation about an axis, a chamber defined by a first sealing surface in said roller cutter and a second sealing surface in said head, and a radially oriented annular resilient seal disposed in said chamber in sealing engagement with said first and second sealing surfaces for isolating said bearings from ambient fluid, the improvement wherein:

said first sealing surface is generally V-shaped in cross-section as formed by first and second spaced apart side portions interconnected by an intermediate portion, said side portions and intermediate portion pressing against said seal with sealing engagement being uninterrupted along said intermediate portion, said first and second side portions mutually diverging in a direction toward said second sealing surface and forming an acute angle therebetween and each oriented at an acute angle relative to the plane of said seal to define a region between said side portions which is smaller than a section of said seal disposed in said region when said seal section is measured in a relaxed state, so that said side portions pinch the corresponding sides of said seal section to impart a sealing pressure to said sides of said seal section which is greater than the maximum sealing pressure at said intermediate portion and resists movement of said seal section relative to said first sealing surface in directions within and laterally of said plane of said seal, and to produce a bulging of said seal toward a section of said second sealing surface located intermediate said side portions of said first sealing surface to produce a sealing pressure at said section of said second sealing surface which is greater than a maximum sealing pressure at said side portions of said first sealing surface.

2. A drill bit according to claim 1, wherein said intermediate portion has a curvature with a radius, said side portions extending toward said second sealing surface substantially as far as the center of said radius.

3. A drill bit according to claim 1, wherein said acute angle formed between said side portions is less than 70°.

4. A drill bit according to claim 3, wherein said acute angles formed by each of said side portions with said plane of said seal are equal.

5. A drill bit according to claim 1, wherein said seal comprises an O-ring of circular cross-section.

6. A drill bit according to claim 5, wherein said intermediate portion has a curvature, the radius of which being less than the radius of a cross-section taken through said O-ring when said O-ring is in a relaxed condition, said side portions oriented tangentially to said intermediate portion.

7. A drill bit according to claim 5, wherein the largest dimension of said chamber in the radial direction is between 90% and 150% of the diameter of said O-ring when said O-ring is in a relaxed state.

8. A drill bit according to claim 7, wherein there is a gap between said head and rotary cutter, said gap lying in a plane oriented perpendicularly to the axis of rotation of said rotary cutter, the largest dimension of said chamber in the radial direction being larger than R(1-sin $\beta$) wherein R is the radius of curvature of said intermediate portion and $\beta$ is the angle formed between said plane of said O-ring and the one of said side portions located closest to said gap.

* * * * *